United States Patent
Karnowski

Patent Number: 6,009,165
Date of Patent: Dec. 28, 1999

[54] FULL DUPLEX SPEAKERPHONE SYSTEM

[75] Inventor: Mark J. Karnowski, Long Beach, Calif.

[73] Assignee: Casio PhoneMate, Inc., Torance, Calif.

[21] Appl. No.: 08/920,268

[22] Filed: Aug. 22, 1997

[51] Int. Cl.⁶ .................................................. H04M 9/00
[52] U.S. Cl. ......................... 379/420; 379/388; 379/390; 341/110
[58] Field of Search .................... 379/420, 390, 379/388, 389, 391, 402, 406, 408, 409, 410, 411; 341/110; 381/96, 99, 111

[56] References Cited

U.S. PATENT DOCUMENTS

| | | | |
|---|---|---|---|
| 4,180,706 | 12/1979 | Bakgaard | 381/96 |
| 4,629,829 | 12/1986 | Puhl et al. | 379/390 |
| 5,075,687 | 12/1991 | Chen et al. | 341/110 |
| 5,323,458 | 6/1994 | Park et al. | 379/390 |
| 5,600,718 | 2/1997 | Dent et al. | 379/406 |
| 5,612,996 | 3/1997 | Li | 379/406 |
| 5,657,384 | 8/1997 | Staudacher et al. | 379/388 |
| 5,768,364 | 6/1998 | Karnowski et al. | 379/420 |
| 5,787,165 | 7/1998 | Lilja et al. | 379/390 |
| 5,796,818 | 8/1998 | McClennon et al. | 379/390 |
| 5,838,787 | 11/1998 | Ding et al. | 379/420 |

*Primary Examiner*—Forester W. Isen
*Assistant Examiner*—Jacques M. Saint-Surin
*Attorney, Agent, or Firm*—Frishauf, Holtz, Goodman Langer & Chick, P.C.

[57] ABSTRACT

The improved full duplex speakerphone system replaces two A/D converters normally required in conventional speakerphone systems with a single A/D converter. This single A/D converter is a higher speed A/D converter which is multiplexed at its input. By alternately connecting the A/D converter between a microphone input circuit and a telephone line input circuit, the single higher speed A/D converter can be used to digitize both input signals. Because the A/D converter samples the data at a much higher rate and uses a digital filter to greatly reduce the impact of aliasing, very simple, low cost external filters may be used.

34 Claims, 3 Drawing Sheets

FULL DUPLEX SPEAKERPHONE SYSTEM

BACKGROUND OF THE INVENTION

1. Field of the Invention

The present invention relates to telephone communication systems, particularly to speakerphone devices and systems and, more particularly to full duplex speakerphone systems.

2. Background Information

Speakerphones (i.e., telephone terminal devices) which permit a local user to communicate via a telephone network with a distally located party without the use of a handset, are common in today's market place. The use of a telephone without a handset is sometimes referred to as "hands-free" operation. Similar to traditional telephones, speakerphones include both a speaker and a microphone. However, in the case of a speakerphone, the speaker and microphone are not secured in a handset that must be held by a user proximate to the user's ear and mouth. Hereinafter, in order to avoid possible confusion, the term "loudspeaker" (as opposed to "speaker") will be utilized when referring to an audio transducer for converting electrical signals into sound energy.

A full duplex speakerphone refers to a telecommunications system capable of simultaneously transmitting audio signals in two directions (that is, it can simultaneously transmit and receive audio signals). In order for a full duplex speakerphone to avoid undesirable audio feedback, a sophisticated process of adaptive echo cancellation of the near end telephone line and acoustic signals is required. Substantially all full duplex speakerphones employ digital signal processors (DSPs) in order to implement adaptive echo cancellation.

Known full duplex DSP based speakerphones utilize a pair of coder-decoders (CODECs) to process the audio signals provided via the telephone line and the microphone. Each CODEC contains an analog-to-digital (A/D) converter and a digital-to-analog (D/A) converter. The first CODEC is coupled to the telephone line and the associated A/D converter digitizes the audio signals provided by the telephone line (i.e., from the distally located party) so that they can be processed before being provided to the speakerphone's loudspeaker. The second CODEC is coupled to the microphone and the associated A/D converter digitizes the audio signals provided by the microphone so that they can be processed before being transmitted via the telephone line. The D/A converter of the first CODEC converts digitally processed signals originating from the microphone to analog signals so that they can be sent to the telephone line. The D/A converter of the second CODEC converts the digitally processed signals originating from the telephone line to analog signals so that they can be provided to the loudspeaker. Each of the first and second CODECs may also include two filters (one coupled to each input and output) to remove high frequency noise so as to avoid aliasing.

A full duplex speakerphone is preferable to a half duplex (or switching) speakerphone. Full duplex speakerphones allow both parties to speak and be heard at the same time (simulating a face-to-face conversation). In contrast, in a half duplex speakerphone similar to the type disclosed in U.S. application Ser. No. 08/454,689 filed May 31, 1996 and assigned to the same assignee as the present application (the entire content of which is incorporated herein by reference), only one channel (i.e., either the transmit or receive channel) is active at any given time. As a result, only one party's voice can be transmitted at a time. Although desirable, full duplex speakerphones are not typically purchased by consumers because the traditional design of these devices make them expensive due to the high cost of the components (e.g. the two CODECs).

Digital, DSP-based full duplex speakerphones are well known. U.S. Pat. No. 4,629,829 to Puhl et al. describes a full duplex speakerphone with two A/D converters, two D/A converters and two adaptive filters. DSP Group, Inc. manufactures chipsets for full duplex speakerphones and each chipset contains two CODECs. However, the cost of the chipsets are relatively high as compared to the entire cost of the components for a full duplex speakerphone. Obviously, it would be a considerable improvement if a full duplex speakerphone could be realized without requiring two CODECs (that is, two A/D converters and two D/A converters).

OBJECTS AND SUMMARY OF THE INVENTION

Accordingly, it is an object of the present invention to provide an improved, low-cost full duplex speakerphone.

It is another object of the present invention to provide an improved, low-cost full duplex speakerphone without using two analog-to-digital converters and two digital-to-analog converters.

It is yet another object of the present invention to provide a full duplex speakerphone which overcomes the inherent disadvantages of known full duplex speakerphones.

In accordance with one form of the present invention, a full duplex speakerphone includes a microphone input circuit for generating a transmit audio signal, a telephone line input circuit for processing a receive signal from a telephone line in, an analog-to-digital converter for converting the transmit audio signal and the receive signal from analog signals to digital signals, and a switch, responsive to a control signal, for alternately coupling at least one of the microphone input circuit and the telephone line input circuit to the analog-to-digital converter.

In accordance with the aforementioned form of the present invention, the two A/D converters normally required in conventional speakerphones are replaced with a single A/D converter. This single A/D converter is a higher speed A/D converter which is multiplexed at its input. By alternately connecting the A/D converter input between the microphone input circuit and the telephone line input circuit, the single higher speed A/D converter can be used to digitize both input signals. Of course, it may be necessary to provide separate external filters for each of the microphone and the telephone line signal inputs and outputs. However utilization of oversampling can greatly simplify these filters. Because the A/D converter of the present invention samples the data at a much higher rate and uses a digital filter to greatly reduce the impact of aliasing, very simple, low cost external filters may be used. Many state-of-the-art conversion devices are available for higher speed video and audio applications. These conversion devices are capable of much higher sampling rates than are required for standard speakerphones or other telecommunication applications. Such conversion devices are commonly used for low cost electronic devices, including compact disc players and computer video cards. Because of their wide spread use, these conversion devices are low in cost despite having very high sampling rates. The present invention takes advantage of this by multiplexing a single low cost, easily available conversion device that has a high sampling rate in order to replace several conversion devices, thereby reducing system cost.

In accordance with another form of the present invention, a full duplex speakerphone includes a microphone input circuit for generating a transmit audio signal, a telephone line input circuit for processing a receive signal from a telephone line in, an analog-to-digital converter for converting the transmit audio signal and the receive signal from analog signals to digital signals, a switch responsive to a control signal for alternately coupling at least one of the microphone input circuit and the telephone line input circuit to the analog-to-digital converter, a digital signal processor coupled to an output port of the analog-to-digital converter for providing the control signal to the switch, and a digital-to-analog converter coupled to the digital signal processor for converting signals associated with the transmit audio signal and the receive signal from digital to analog signals.

In accordance with the aforementioned form of the present invention, a full duplex speakerphone is realized using only a single A/D converter and a single D/A converter. The single D/A converter has an output coupled to two separate sample and hold amplifiers. The first sample and hold amplifier is connected to a loudspeaker and the second sample and hold amplifier is connected to a telephone line out. The output of the single D/A converter is set to a certain level, for example, it would be set to a level associated with the loudspeaker which would be held by the first sample and hold amplifier. Then, the output of the D/A converter is set to a level associated with the telephone line which is held by the second sample and hold amplifier. Subsequently a new output level associated with the loudspeaker is set by the D/A converter which is held by the first sample and hold amplifier. By alternating outputs in this manner, the two separate output signals required for a full duplex speakerphone can be processed almost simultaneously.

When all aspects of the above-identified form of the present invention are realized, the full duplex speakerphone can be implemented with only a single A/D converter and a single D/A converter, thereby effectively eliminating one CODEC. The additional circuitry required (the sample and hold amplifiers, switches, and simple filters) costs substantially less than an entire CODEC. Furthermore, these additional elements are very easily integrated into monolithic form which makes integration of the present invention into a semiconductor chip feasible and cost effective. Generally speaking, when considering the integration of all the elements necessary for implementing a full duplex speakerphone system, the most expensive and difficult elements to integrate into a single chip are the A/D and D/A converters. These elements typically use a significant amount of chip area and are therefore expensive in terms of integration. By eliminating a number of conversion elements and replacing them with simply constructed switching and analog elements (such as op-amps and comparators), the resulting overall cost of integration may be reduced.

In accordance with another form of the present invention, a full duplex speakerphone includes a microphone input circuit for generating a transmit audio signal, a telephone line input circuit for processing a receive signal from a telephone line in, a first sample and hold amplifier for alternately storing and providing a transmit audio signal and the receive signal, a switch responsive to a switch control signal for alternately coupling at least one of the microphone input circuit and the telephone line input circuit to the first sample and hold amplifier, a comparator having first and second inputs and an output wherein the comparator first input is coupled to an output of the first sample and hold amplifier, a digital signal processor operatively coupled to the switch, the first sample and hold amplifier and the comparator, and a digital-to-analog converter having an input port operatively coupled to the digital signal processor and an output coupled to the second input of the comparator.

In accordance with the aforementioned form of the present invention, a full duplex speakerphone is realized using only a single D/A converter. Accordingly, the full duplex speakerphone of the third embodiment uses the D/A converter as one element of a successive approximation A/D converter to successively convert both the microphone signal input and the telephone line signal input. As in the previous embodiments, the microphone signal and the telephone line signal each pass through a filter so as to reduce the impact of aliasing on the signals. Then, a switch alternately connects the output of each filter to a sample and hold amplifier which in turn has its output coupled to a comparator. Through an iterative approximation method, each of the signals are digitized. A digital signal processor will output the appropriate signal (that is, either the microphone signal or the telephone line signal) to the D/A converter and command a respective sample and hold amplifier to capture the signal and hold it until the next appropriate sample is output. Subsequently the signal is filtered and passed to either the loudspeaker (for the telephone line signal) or to the line (for the microphone signal).

All the embodiments of the present invention take advantage of the fact that a full duplex speakerphone operates in an audio range which is of relatively low frequency compared to the sampling rates that most modern A/D and D/A converters are capable of operating. By simply making A/D and D/A converters operate faster and using multiplexing techniques, the cost of the additional conversion elements can be eliminated, as well as simplifying or eliminating complex filters.

A preferred form of the improved full duplex speakerphone system, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
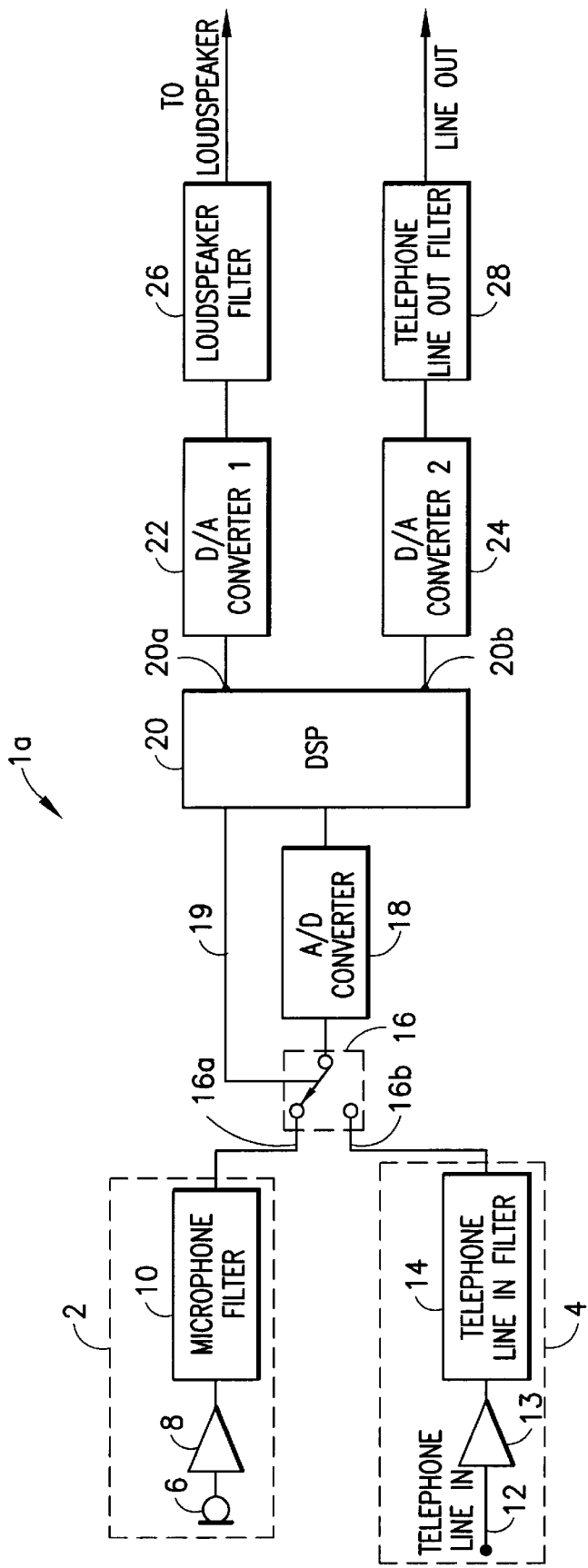
FIG. 1 is a block diagram of an improved full duplex speakerphone in accordance with a first embodiment of the present invention.

Referring now to FIG. 1, a block diagram of a full duplex speakerphone 1a according to a first embodiment of the present invention is shown. The full duplex speakerphone 1a includes a microphone input circuit 2. The microphone input circuit 2 includes a microphone 6, a microphone amplifier 8, and a microphone filter 10. The microphone input circuit 2 is coupled to a first leg 16a of a single pole, double throw (SPDT) switch 16. The full duplex speakerphone 1a also includes a telephone line input circuit 4. The telephone line input circuit 4 includes a telephone line in 12, line amplifier 13 and a telephone line in filter 14. The telephone line input circuit 4 is coupled to a second leg 16b of SPDT switch 16. The microphone filter 10 and the telephone line in filter 14 are employed to reduce the impact of aliasing on the signals provided through microphone input circuit 2 and telephone line input circuit 4. The full duplex speakerphone 1a further includes an A/D converter 18 and a DSP 20 operatively coupled to SPDT switch 16. Under the control of the DSP 20 via line 19, SPDT switch 16 is rapidly alternately switched between the output of the microphone input circuit 2 (i.e., first leg 16a) and the output of the telephone line input circuit 4 (i.e., second leg 16b).

As described at pages 7, 90 and 94 of *Digital Coding of Waveforms—Principles and Applications to Speech and Video*, by N. S Jayant and Peter Noll published by Prentice Hall, Inc. (1984), the entire disclosure of which is incorporated herein by reference, one of the most fundamental concepts in digital signal processing is the Nyquist Sampling Theorem. The Nyguist Sampling Theorem states that given a waveform with a bandwidth W, it is possible to reconstruct a waveform from its samples if the sampling rate is at least equal to 2W samples per second. Under most circumstances, the frequencies of interest for telephone line applications range between 300 Hz and 3.4 kHz. Therefore in order to satisfy the Nyquist Sampling Theorem, a minimum sampling rate of 8 kHz is preferably chosen (i.e., the microphone (transmit) input signal and the telephone line input (receive) signal will each be sampled at least once every 125 microseconds). In order to sample both the transmit and receive inputs, it is necessary to divide the sampling process into two phases, each no more than 62.5 microseconds in duration. It will be appreciated that different sampling rates may be chosen based on system requirements and designer choice.

Referring again to FIG. 1 and with the above in mind, in the first phase of the sampling process the SPDT switch 16 is positioned (i.e., the switch is coupled to first leg 16a) such that a transmit (analog) signal passes from the microphone 6 through the microphone amplifier 8 and microphone filter 10, and is provided to the A/D converter 18. Once provided to the A/D converter 18, the analog transmit signal is converted to a digital transmit signal (i.e., a digital representation of the analog transmit signal). The digitized transmit signal is then provided to a digital signal processor (DSP) 20, which is operatively coupled to the output port of A/D converter 18, for further signal processing (e.g. echo cancellation).

In the second phase of the sampling process, the SPDT switch 16 alters its configuration (i.e., the switch is coupled to second leg 16b) so as to couple the telephone line input circuit 4 to the input of A/D converter 18. Specifically, the receive signal, which has been provided by telephone line in 12, is provided through line amplifier 13 and telephone line in filter 14. The receive signal is then provided to the A/D converter 18 via switch 16 where the analog receive signal is converted to a digital signal (i.e., a digital representation of the analog receive signal). The digital signal is then provided to DSP 20 for further signal processing. This cycle (i.e., the sampling of both the transmit and receive signals) is repeated every 125 microseconds.

The components coupled to the output of DSP 20 are similar to those that are included in the conventional full duplex speakerphone. Specifically, the DSP includes two output ports 20a and 20b, respectively coupled to first and second D/A converters 22 and 24. The first D/A converter 22 has an output coupled to a loudspeaker filter 26. The second D/A converter 24 has an output coupled to a telephone line out filter 28. Under this configuration, the DSP 20 has both the transmit and receive signals available, and the DSP outputs the corresponding signals to the first and second D/A converters 22, 24 once every 125 microseconds.

Figure 2:
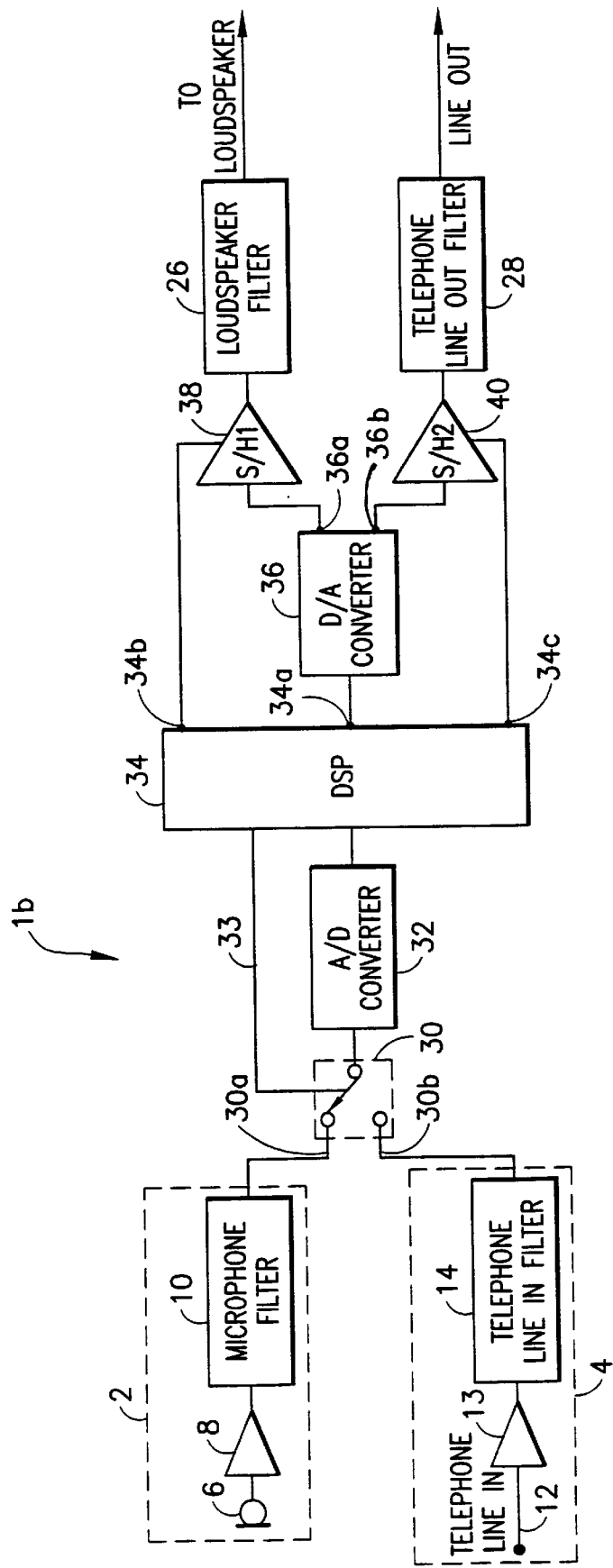
FIG. 2 is a block diagram of an improved full duplex speakerphone in accordance with a second embodiment of the present invention.

Referring now to FIG. 2, a block diagram of a full duplex speakerphone 1b according to a second embodiment of the present invention will now be described.

The full duplex speakerphone 1b of the second embodiment is similar to the full duplex speakerphone shown in FIG. 1, inter alia, in that the invention shown in FIG. 2 includes a microphone input circuit 2 and a telephone line input circuit 4 as previously described. The microphone input circuit 2, which includes microphone 6, microphone amplifier 8, and microphone filter 10, is coupled to a first leg 30a of SPDT switch 30. The telephone line input circuit 4, which includes telephone line in 12, line amplifier 13 and telephone line filter 14, is coupled to a second leg 30b of switch 30. Coupled to the output of SPDT switch 30 is an A/D converter 32. SPDT switch 30 which is coupled to the input of the A/D converter 32 is rapidly alternately switched between the microphone input circuit 2 and the telephone line input circuit 4 under control of a DSP 34. The DSP 34 controls the SPDT switch 30 via line 33 by rapidly alternately switching SPDT switch 30 between the output of the microphone input circuit 2 (i.e., first leg 30a) and the output of the telephone line input circuit 4 (i.e., second leg 30b).

The output port of the A/D converter 32 is coupled to DSP 34. The DSP 34 preferably has at least three output ports 34a, 34b, 34c. A first output port 34a is coupled to a D/A converter 36 while the second and third DSP output ports 34b, 34c are respectively coupled via control lines to first and second sample and hold amplifiers 38, 40. The D/A converter 36 has first and second output ports 36a, 36b. The first output port 36a is coupled to the first sample and hold amplifier 38 and the second output port 36b is coupled to the second sample and hold amplifier 40. The output of the first sample and hold amplifier 38 is coupled to a loudspeaker filter 26 and the output of the second sample and hold amplifier 40 is coupled to a telephone line out filter 28. The DSP 34 is preferably responsive to the A/D converter 32 output signal. The DSP 34 provides a DSP output signal to the D/A converter 36 via output port 34a. The D/A converter 36 converts the DSP digital output signal to an analog signal which is provided to each of the first and second sample and hold amplifiers 38, 40 as an input signal.

After the first sample and hold amplifier 38 has had sufficient time to acquire and sample the telephone line input signal provided thereto, the DSP 34 commands the first sample and hold amplifier 38 to maintain the sampled receive signal level until the next receive signal sampling operation is performed. Similarly, the output signal intended for the telephone line is acquired and sampled by the second sample and hold amplifier 40 and the sampled transmit signal level is maintained until the next transmit signal sample is taken. This sample and hold operation is repeated every 125 microseconds (i.e., eight times per second).

Figure 3:
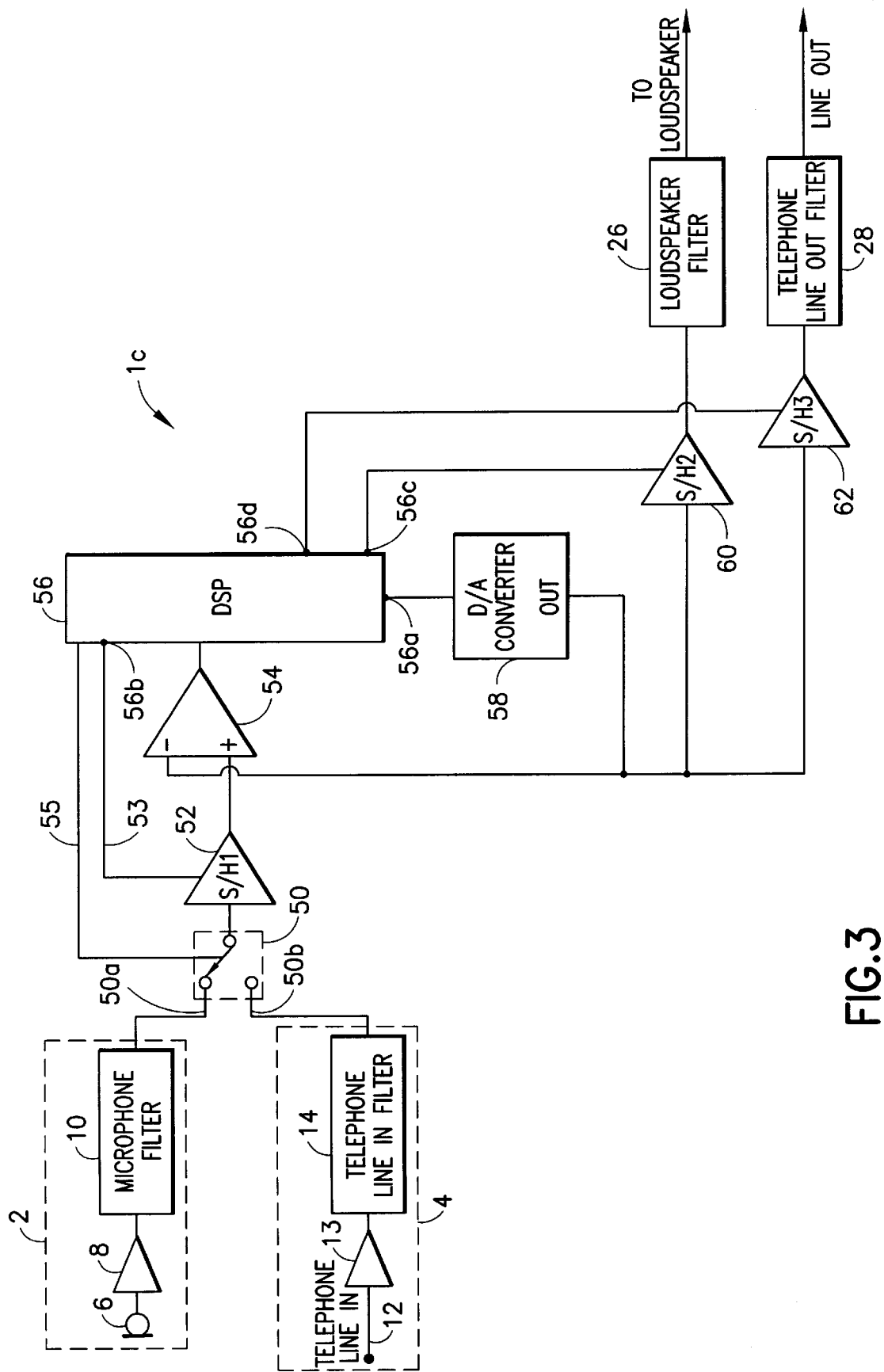
FIG. 3 is a block diagram of an improved full duplex speakerphone in accordance with a third embodiment of the present invention.

Referring now to FIG. 3, a block diagram of a full duplex speakerphone 1c according to a third embodiment of the present invention will now be described. As stated in connection with the first and second embodiments 1a and 1b, the frequencies of interest for telephone line applications range between 300 Hz and 3.4 kHz. In a fully multiplexed system such as this third embodiment, if a sampling rate of 8 kHz is chosen, in order for the Nyquist Sampling Theorem to be satisfied, each of the two input signals and each of the two output signals are preferably sampled at least once every 125 microseconds.

The full duplex speakerphone 1c includes a microphone input circuit 2 as previously described. The microphone input circuit is coupled to a first leg 50a of a single-pole, double-throw (SPDT) switch 50. The full duplex speakerphone 1c also includes a telephone line input circuit 4 as previously described. The telephone line input circuit 4 includes a telephone line in 12 operatively coupled to a line amplifier 13 and a telephone line filter 14. The telephone line input circuit 4 is operatively coupled to a second leg 50b of SPDT switch 50. The SPDT switch 50 is controlled via line 55 by digital signal processor (DSP) 56 (as explained above)so as to be rapidly and alternately coupled to either the microphone input circuit 2 or the telephone line input circuit 4.

Operatively coupled to the SPDT switch 50 is a first sample and hold amplifier 52. The first sample and hold amplifier 52 is coupled to, and controlled by, DSP 56 via line 53. The output of the first sample and hold amplifier 52 is coupled to a non-inverting input of comparator 54. The inverting input of comparator 54 is coupled to an output of D/A converter 58. The output of comparator 54 is coupled to an input of DSP 56. An output port 56a of DSP 56 is coupled to an input port of the D/A convertor 58.

The full duplex speakerphone 1c also includes second and third sample and hold amplifiers 60, 62 whose inputs are operatively coupled to the output of the D/A converter 58. Each of the second and third sample and hold amplifiers 60, 62 are also operatively respectively coupled to output ports 56c, 56d of DSP 56 which controls the operation of each sample and hold amplifier 60, 62. The output of the second sample and hold amplifier 60 is coupled to loudspeaker filter 26 which provides a signal to a loudspeaker for output. The output of the third sample and hold amplifier 62 is operatively coupled to telephone line out filter 28.

With regard to the present invention in connection with third embodiment, it is preferable to divide the sampling process into four phases, preferably averaging no more than 31.25 microseconds per phase. Four phases are preferred because D/A converter 58 must perform a dual function. During the first and second phases, the D/A converter 58 is used as an element of a successive approximation of an A/D converter. The method of employing an A/D converter in this manner is well known in the art and therefore not explained here in detail. During the third and fourth phases, the D/A converter 58 is used to convert a digital signal provided by the DSP 56 into an analog signal.

In the first phase of operation in connection with the third embodiment, an analog microphone signal (i.e., transmit signal) from microphone 6 is amplified by microphone amplifier 8 and filtered by the microphone filter 10. Switch 50 is positioned (i.e., coupled to first leg 50a) so as to couple the output of the microphone input circuit 2 (corresponding to the microphone filter output) to first sample and hold amplifier 52. The analog microphone signal is sampled by the first sample and hold amplifier 52. The first sample and hold amplifier 52 provides comparator 54 with a constant input level in which to perform comparison operations. The analog microphone signal is provided to D/A converter 58 via DSP 56 and digitized by D/A converter 58 (which is one element of the successive approximation A/D converter). The D/A converter 58 is first set at half of its range and the resulting value is provided to the inverting input of comparator 54.

Comparator 54 compares the input signal being maintained by the first sample and hold amplifier 52 (i.e., being provided to the non-inverting input) to the first estimated digital value generated by the D/A converter 58 (provided to the inverting input). A digital representation of the microphone input signal is achieved by D/A converter 58 by iteratively comparing and changing the estimated digital value in accordance with well known successive approximation approaches for A/D conversion. Thus, the D/A converter 58 output signal is successively modified so that the system determines a digitized value for the analog microphone input. Utilizing the existing state of the art D/A converters, this can easily be done within the 31.25 microseconds required for proper operation (i.e., 31.25 microseconds for each phase of operation results in the two output signals being sampled at least once every 125 microseconds). A digital representation of the microphone input signal is processed and stored in DSP 56 until the signal is appropriately output to the telephone line out.

In the second phase of the operation, a telephone line input signal transmitted on telephone line in 12 is provided to line amplifier 13, and once amplified, provided to telephone line in filter 14. SPDT switch 50, which is operatively coupled to the output of telephone line input circuit 4, shifts its position from that employed in connection with the first phase of operation such that the SPDT switch 50 operatively couples the telephone line input circuit 4 to the input of the first sample and hold amplifier 52 (i.e., the switch is coupled to second leg 50b). As a result, the analog telephone line input signal is digitized as described above in connection with the first phase of operation. The telephone line input signal value is processed and stored in the DSP 56 until it is provided to the loudspeaker (not shown). Thus, in the first two phases, both the microphone and telephone line input signals are stored in the DSP.

In the third phase of operation, the D/A converter 58 converts the digitized telephone line input signal, which is intended for transmission to the loudspeaker filter 26, to an analog signal. After the second sample and hold amplifier 60 has acquired and sampled the analog telephone line input signal (i.e., D/A converter output signal), the second sample and hold amplifier 60 maintains the signal level until a subsequent signal is sampled.

In the fourth phase of operation, the D/A converter 58 converts the digitized microphone line input (transmit) signal which is intended for transmission to the telephone line out filter 28 to an analog signal. After the third sample and hold amplifier 62 has acquired and sampled the analog microphone line input signal, the third sample and hold amplifier 62 maintains the output transmit signal level until the next transmit signal sample. By dividing the 125 microsecond process into four phases, wherein each phase is no longer than 31.25 microseconds on average, the DSP 56 has access and can be utilized for both the microphone input circuit 2 and the telephone line in circuit 4. Accordingly, the DSP 56 is capable of outputting the respective signals to the telephone line out (not shown) and the loudspeaker (not shown) using only a single (i.e., one) D/A converter 58.

A further aspect of the invention enables simplification of the input filters, 10 and 14, and output filters, 26 and 28, in all of the embodiments of the invention. By employing faster conversion elements, oversampling techniques can be used to simplify the filters. For example, if signal conversions are performed at a substantially higher rate than the input frequencies, the oversampled signals are easily digitally filtered by the DSP. This permits the cut-off requirements of the associated filters to be greatly simplified, thereby reducing the cost of manufacture system.

As a further requirement, as referenced in *Multirate Digital Signal Processing* by Ronald E. Crochiere and Lawrence R. Rabiner, by utilizing techniques such as delta modulation in a highly oversampled signal, the need for expensive anti-aliasing filters can be eliminated.

Although the descriptions above contain many specifics, these should not serve to limit the scope of the invention, but rather provide illustrations of preferred embodiments of the invention. For example, the order of the phases of operation may be altered.

Thus, having described specific preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as defined in the appended claims.

What is claimed is:

1. A speakerphone, comprising:
    a microphone input circuit for generating a transmit audio signal;
    a telephone line input circuit for processing an analog receive signal from a telephone line in;
    a single analog-to-digital converter for converting the transmit audio signal and the receive signal from analog signals to digital signals; and
    a switch, responsive to a control signal, for alternately coupling at least one of said microphone input circuit and said telephone line input circuit to said single analog-to-digital converter based on a sampling rate which enables said speakerphone to operate as a full duplex speakerphone.

2. A speakerphone according to claim 1, wherein said microphone input circuit comprises:
    a microphone for generating a microphone audio signal;
    an amplifier operatively coupled to said microphone for amplifying the microphone audio signal; and
    a first filter operatively coupled to said amplifier, said first filter filtering the amplified microphone audio signal and providing the transmit audio signal.

3. A speakerphone according to claim 1, wherein said telephone line input circuit comprises:
    a telephone line in input for receiving a telephone signal; and
    a second filter operatively coupled to said telephone line in input, said second filter filtering the telephone signal and providing the receive signal.

4. A speakerphone according to claim 3, wherein said telephone line input circuit further comprises:
    an amplifier operatively coupled to both the telephone line in input and said second filter.

5. A speakerphone according to claim 1, further comprising:
    a digital signal processor operatively coupled to an output port of said analog-to-digital converter, said digital signal processor generating and providing the control signal to said switch.

6. A speakerphone according to claim 5, further comprising:
    a first digital-to-analog converter operatively coupled to a first output port of said digital signal processor for converting said transmit audio signal from an analog signal to a digital signal.

7. A speakerphone according to claim 6, further comprising:
    a loudspeaker filter operatively coupled to said first digital-to-analog converter for filtering the digital transmit audio signal.

8. A speakerphone according to claim 5, further comprising:
    a second digital-to-analog converter operatively coupled to a second output port of said digital signal processor for converting said receive signal from an analog signal to a digital signal.

9. A speakerphone according to claim 8, further comprising:
    a telephone line out filter operatively coupled to said first digital-to-analog converter for filtering the digital receive signal.

10. A speakerphone, comprising:
    a microphone input circuit for generating a transmit audio signal;
    a telephone line input circuit for processing an analog receive signal from a telephone line in;
    a single analog-to-digital converter for converting the transmit audio signal and said receive signal from analog signals to digital signals; and
    a switch, responsive to a switch control signal, for alternately coupling at least one of said microphone input circuit and said telephone line input circuit to said single analog-to digital converter based on a sampling rate which enables said speakerphone to operate as a full duplex speakerphone;
    a digital signal processor coupled to an output port of said single analog-to-digital converter, said digital signal processor generating and providing the switch control signal to said switch; and
    a single digital-to-analog converter coupled to said digital signal processor for converting signals associated with the transmit audio signal and the receive signal from digital signals to analog signals.

11. A speakerphone according to claim 10, wherein said microphone input circuit comprises:
    a microphone for generating a microphone audio signal;
    an amplifier operatively coupled to said microphone for amplifying the microphone audio signal; and
    a first filter operatively coupled to said amplifier, said first filter filtering the amplified microphone audio signal and providing the transmit audio signal.

12. A speakerphone according to claim 10, wherein said telephone line input circuit comprises:
    a telephone line in input for receiving a telephone signal; and
    a second filter operatively coupled to said telephone line in input, said second filter filtering the telephone signal and providing the receive signal.

13. A speakerphone according to claim 12, wherein said telephone line input circuit further comprises:
    an amplifier operatively coupled to both said telephone line in input and said second filter.

14. A speakerphone according to claim 10, wherein said digital signal processor processes the receive signal.

15. A speakerphone according to claim 10, further comprising:
    a first sample and hold amplifier operatively coupled to the output of said single digital-to-analog converter, said first sample and hold amplifier being responsive to a first control signal for storing and providing the processed receive signal.

16. A speakerphone according to claim 15, further comprising:
    a loudspeaker filter operatively coupled to said first sample and hold amplifier for filtering the processed receive signal.

17. A speakerphone according to claim 15, wherein said digital signal processor generates and provides the first control signal to said first sample and hold amplifier.

18. A speakerphone according to claim 10, wherein said digital signal processor processes the transmit audio signal.

19. A speakerphone according to claim 10, further comprising:
- a second sample and hold amplifier operatively coupled to said digital-to-analog converter, said second sample and hold amplifier being responsive to a second control signal for storing and providing the processed transmit audio signal.

20. A speakerphone according to claim 19, further comprising:
- a telephone line out filter operatively coupled to said second sample and hold amplifier for filtering the processed transmit audio signal.

21. A speakerphone according to claim 19, wherein said digital signal processor generates and provides the second control signal to said second sample and hold amplifier.

22. A speakerphone comprising:
- a microphone input circuit for generating a transmit audio signal;
- a telephone line input circuit for processing an analog receive signal from a telephone line in;
- a first sample and hold amplifier for alternately storing and providing the transmit audio signal and the receive signal;
- a switch, responsive to a control signal, for alternately coupling at least one of said microphone input circuit and said telephone line circuit to said first sample and hold amplifier based on a sampling rate which enables said speakerphone to operate as a full-duplex speakerphone;
- a comparator having first and second input ports and an output port, said comparator first input port being coupled to an output port of said first sample and hold amplifier;
- a digital signal processor operatively coupled to said switch, said first sample and hold amplifier, and the output port of said comparator; and
- a single digital-to-analog converter having an input port operatively coupled to said digital signal processor and an output port operatively coupled to said second input port of said comparator.

23. A speakerphone according to claim 22, wherein said microphone input circuit comprises:
- a microphone for generating a microphone audio signal;
- an amplifier operatively coupled to said microphone for amplifying the microphone audio signal; and
- a first filter operatively coupled to said amplifier, said first filter filtering the amplified microphone audio signal and providing the transmit audio signal.

24. A speakerphone according to claim 22, wherein said telephone line input circuit comprises:
- a telephone line in input for receiving a telephone signal; and
- a second filter operatively coupled to said telephone line in input, said second filter filtering the telephone signal and providing the receive signal.

25. A speakerphone according to claim 24, wherein said telephone line input circuit further comprises:
- an amplifier operatively coupled to both the telephone line in input and said second filter.

26. A speakerphone according to claim 22, wherein said digital signal processor provides said switch control signal to said switch.

27. A speakerphone according to claim 22, wherein said first sample and hold amplifier, being responsive to a first control signal, selectively stores and provides said transmit audio and receive signals.

28. A speakerphone according to claim 27, wherein said digital signal processor provides said first control signal to said first sample and hold amplifier.

29. A speakerphone according to claim 22, further comprising:
- a second sample and hold amplifier operatively coupled to said digital-to-analog converter output, said second sample and hold amplifier being responsive to a second control signal for storing and providing the transmit audio signal.

30. A speakerphone according to claim 29, wherein said digital signal processor provides said second control signal to said second sample and hold amplifier.

31. A speakerphone according to claim 29, further comprising:
- a third filter operatively coupled to said second sample and hold amplifier, said third filter for filtering said processed receive signal and providing a third filter output signal to a loudspeaker.

32. A speakerphone according to claim 22, further comprising:
- a third sample and hold amplifier operatively coupled to said digital-to-analog converter output, said third sample and hold amplifier being responsive to a third control signal for storing and providing the receive signal.

33. A speakerphone according to claim 32, wherein said digital signal processor provides said third control signal to said third sample and hold amplifier.

34. A speakerphone according to claim 32, further comprising:
- a fourth filter operatively coupled to said third sample and hold amplifier, said fourth filter filtering said processed transmit audio signal.

* * * * *